United States Patent Office.

FERDINAND THIEMER, OF BISCHOFSWERDA, SAXONY, ASSIGNOR TO SALLY G. COHNFELD, OF DRESDEN, GERMANY.

METHOD OF PRODUCING MOLDED ARTICLES FROM SUBSTANCES CONTAINING LIGNEOUS FIBERS.

SPECIFICATION forming part of Letters Patent No. 301,405, dated July 1, 1884.

Application filed June 2, 1884. (No specimens.)

*To all whom it may concern:*

Be it known that I, FERDINAND THIEMER, residing in Bischofswerda, Kingdom of Saxony, Germany, have invented an Improved Method of Producing Molded Articles from Substances Containing Ligneous Fibers, of which the following is a specification.

My invention consists in a new method of producing solid articles from sawdust, wood shavings, wood pulp, dry leaves, straw, hay, and other ligneous substances by treating them with chloride of zinc and basic chloride of magnesium, by pressing the mass into molds and drying it. For this purpose the material to be subjected to the treatment is moistened with a solution of chloride of zinc having, by preference, a specific gravity of 1.028, and thereupon it is dried. Subsequently it is uniformly impregnated with a solution of basic chloride of magnesium, preferably of a specific gravity of from 1.725 to 1.793, so much of this solution being employed as that the mass will only become humid, and that no liquor can be squeezed out therefrom by a gentle pressure—for instance, by hand. The mass is then filled into molds and exposed to the action of a hydraulic or other powerful press. While being maintained under pressure it consolidates, with slight spontaneous elevation of temperature, to compact pieces, which, after removal from the molds, are placed for several days in a heated and ventilated chamber or other suitable place to be dried. The time in which the mass solidifies depends, to a certain degree, upon the strength of the solution of chloride of zinc employed; but ordinarily from ten to twelve hours are required. After having become completely dry the product is immersed for some time, and preferably for a like number of hours in a strong solution of chloride of zinc, which may have a specific gravity of 1.205, and is finally dried again.

The molds to be used, which may be plain or ornamented, are with advantage so constructed as that they may be clamped together by screws or otherwise after the pressure has been applied to them, in order that they may be removed from the press while the mass is maintained under pressure, whereas the press remains at disposal for another series of molds. Besides, they should be provided with slits or holes through which any excess of liquor squeezed out by the pressing operation may flow off. In order to allow the produced articles to be easily detached, it is advisable to slightly grease the molds.

By the described process a material is obtained which may be sawed, planed, and otherwise worked like hard wood, and which assumes a good polish. Besides, it is not apt to be destroyed by fire, it is impervious to water, indestructible by weak acids and alkaline solutions, and resistant to atmospheric influences. It is therefore particularly adapted for architectural ornaments and cabinet-work, and useful for many other purposes.

If desired, suitable colors may be mixed with the raw material previous to or during its treatment with the chemicals, and variegated surfaces may be obtained by a mixture of different materials.

I claim as my invention—

1. The process of producing molded articles from sawdust, wood shavings, wood pulp, dry leaves, straw, hay, and other ligneous materials by treatment with chloride of zinc and basic chloride of magnesium, compression into molds, and drying, substantially as and for the purpose described.

2. As an article of manufacture, the material obtained from sawdust, wood shavings, wood pulp, dry leaves, straw, hay, and other ligneous substances by treatment with chloride of zinc and basic chloride of magnesium, compression into molds, and drying, substantially as and for the purpose specified.

In testimony whereof I have signed my name to this specification in the presence of two subscribing witnesses.

FERDINAND THIEMER.

Witnesses:
 A. MÂLLE,
 PAUL DENCKMÜLLER.